US009420261B2

(12) United States Patent
Ueda et al.

(10) Patent No.: US 9,420,261 B2
(45) Date of Patent: Aug. 16, 2016

(54) IMAGE CAPTURING APPARATUS, METHOD OF CONTROLLING THE SAME AND PROGRAM

(75) Inventors: Toshiharu Ueda, Machida (JP); Takafumi Kishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 231 days.

(21) Appl. No.: 14/131,550

(22) PCT Filed: Jul. 11, 2012

(86) PCT No.: PCT/JP2012/068260
§ 371 (c)(1),
(2), (4) Date: Jan. 8, 2014

(87) PCT Pub. No.: WO2013/024659
PCT Pub. Date: Feb. 21, 2013

(65) Prior Publication Data
US 2014/0139644 A1    May 22, 2014

(30) Foreign Application Priority Data

Aug. 15, 2011    (JP) .................. 2011-177743

(51) Int. Cl.
*H04N 13/02*    (2006.01)
*G02B 7/34*    (2006.01)
(Continued)

(52) U.S. Cl.
CPC .............. *H04N 13/021* (2013.01); *G02B 7/34* (2013.01); *G03B 35/08* (2013.01); *G06T 7/0075* (2013.01);
(Continued)

(58) Field of Classification Search
CPC .................................. H04N 13/021

USPC ............................................. 348/49
See application file for complete search history.

(56) References Cited

U.S. PATENT DOCUMENTS 5,521,639 A * 5/1996 Tomura ............. H01L 27/14831
257/E27.154
5,668,605 A * 9/1997 Nachshon .............. H04N 5/272
348/584

(Continued)

FOREIGN PATENT DOCUMENTS

CN    102103320 A    6/2011
JP    2003-007994 A    1/2003
(Continued)

OTHER PUBLICATIONS

European Search Report issued on Mar. 10, 2015, that issued in the corresponding European Patent Application No. 12824329.2.

(Continued)

*Primary Examiner* — Frederick Bailey
(74) *Attorney, Agent, or Firm* — Cowan, Liebowitz & Latman, P.C.

(57) ABSTRACT

Left- and right-eye captured images are output upon reception of light beams having passed through one imaging optical system, and the difference, between the left- and right-eye captured images, of each of subjects included in the left- and right-eye captured images is detected. An extraction image extracted from a region which includes a main subject and has a predetermined size is output for each of the left- and right-eye captured images. At this time, the region is set so that the difference, between the left- and right-eye captured images, of a subject which is different from the main subject and included in both the extraction images has a predetermined value.

16 Claims, 13 Drawing Sheets

(51) Int. Cl.
*G03B 35/08* (2006.01)
*H04N 5/232* (2006.01)
*G06T 7/00* (2006.01)
G03B 13/36 (2006.01)
H04N 13/00 (2006.01)

(52) U.S. Cl.
CPC ....... *H04N 5/23212* (2013.01); *H04N 13/0217* (2013.01); *H04N 13/0296* (2013.01); *G03B 13/36* (2013.01); *G06T 2207/10012* (2013.01); *H04N 2013/0081* (2013.01)

(56) References Cited

U.S. PATENT DOCUMENTS

| | | | | |
|---|---|---|---|---|
| 6,574,437 | B2* | 6/2003 | Sensui | G03B 13/36 396/111 |
| 6,614,473 | B1* | 9/2003 | Kijima | H04N 5/361 348/241 |
| 6,873,723 | B1* | 3/2005 | Aucsmith | G06K 9/38 345/419 |
| 7,688,367 | B2* | 3/2010 | Matsuoka | H04N 5/3651 348/241 |
| 2004/0233275 | A1 | 11/2004 | Tomita | |
| 2009/0256923 | A1* | 10/2009 | Chou | H04N 5/361 348/222.1 |
| 2010/0302355 | A1* | 12/2010 | Tamaru | G06T 7/0022 348/59 |
| 2011/0019989 | A1* | 1/2011 | Tanaka | H04N 5/23212 396/104 |

FOREIGN PATENT DOCUMENTS

| | | |
|---|---|---|
| JP | 4027113 B | 12/2007 |
| JP | 2010-068182 A | 3/2010 |
| JP | 2010-278878 A | 12/2010 |
| JP | 2011-022796 A | 2/2011 |
| WO | 2009/020277 A | 2/2009 |

OTHER PUBLICATIONS

Nov. 4, 2015 Chinese Office Action, that issued in Chinese Patent Application No. 201280039771.0.

* cited by examiner

F I G. 4A
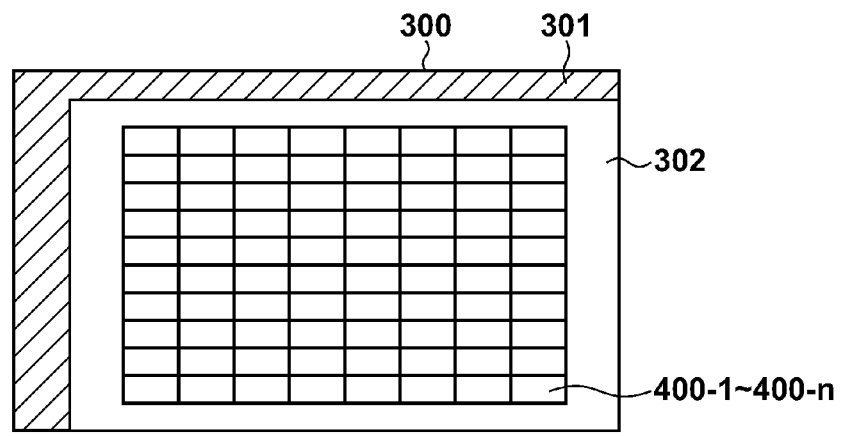
F I G. 4B
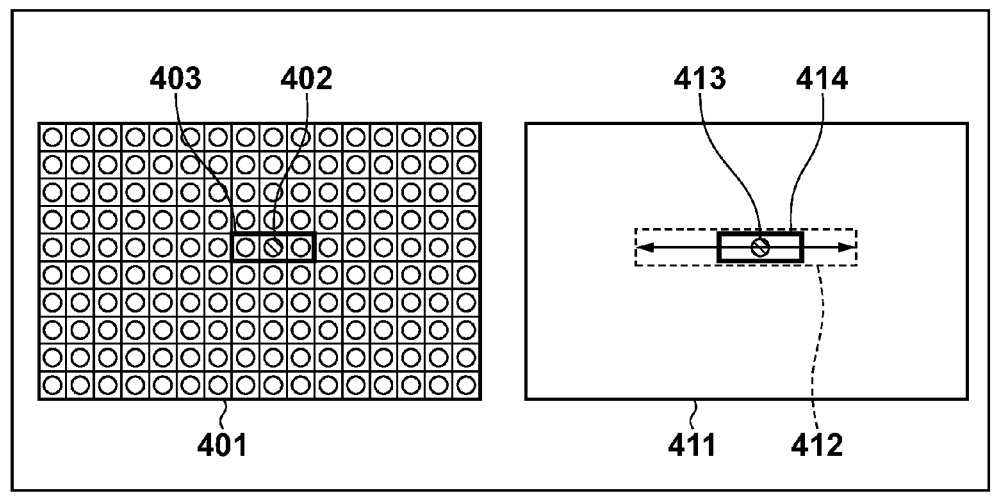

FOR LEFT EYE

FOR RIGHT EYE $Z_n+Z_{f1}$  $Z_{f1}$ (DISPLAY SURFACE) A1  B1  A2  B2 B3  A3

(OBSERVER)

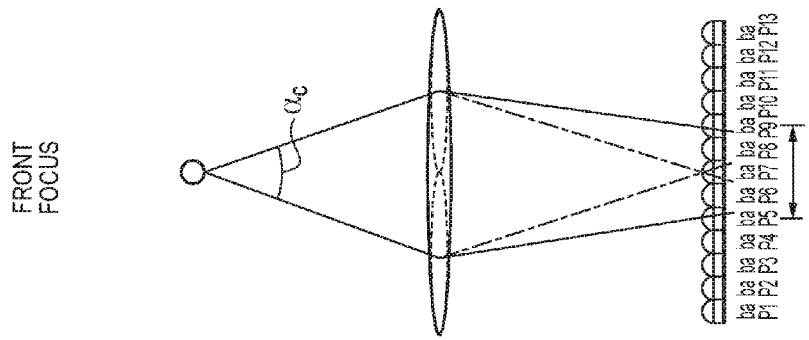
FIG. 12A PRIOR ART IN FOCUS
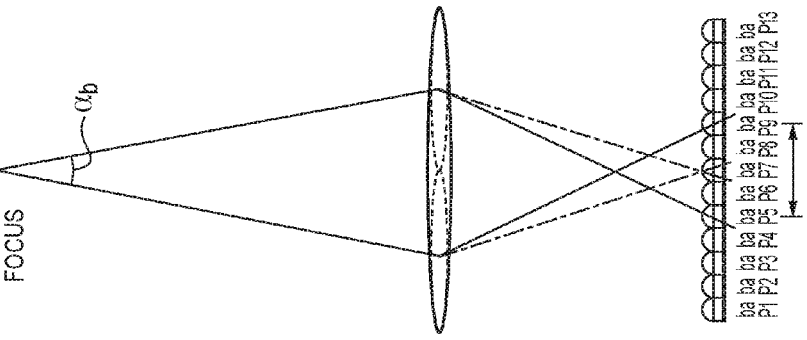
FIG. 12B PRIOR ART REAR FOCUS
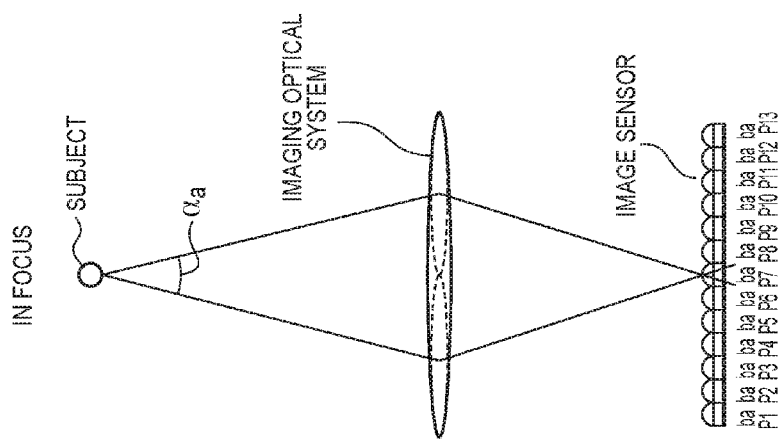
FIG. 12C PRIOR ART FRONT FOCUS

FIG. 12D PRIOR ART
— IMAGE A GROUP
----- IMAGE B GROUP

FIG. 12E PRIOR ART
— IMAGE A GROUP
----- IMAGE B GROUP

FIG. 12F PRIOR ART
— IMAGE A GROUP
----- IMAGE B GROUP

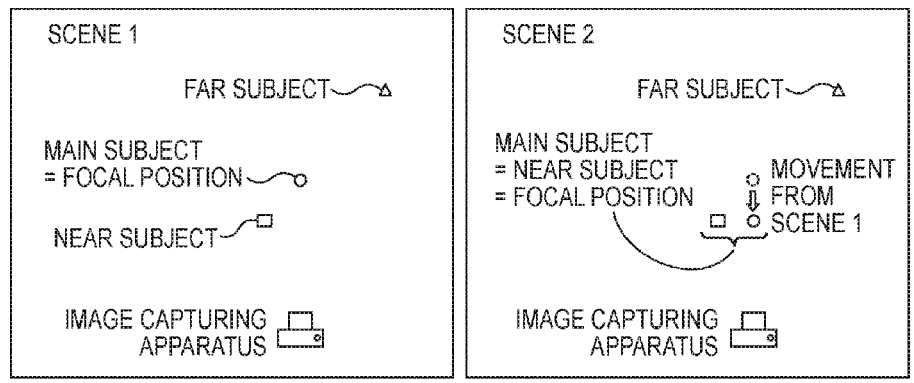
FIG. 13A FIG. 13D
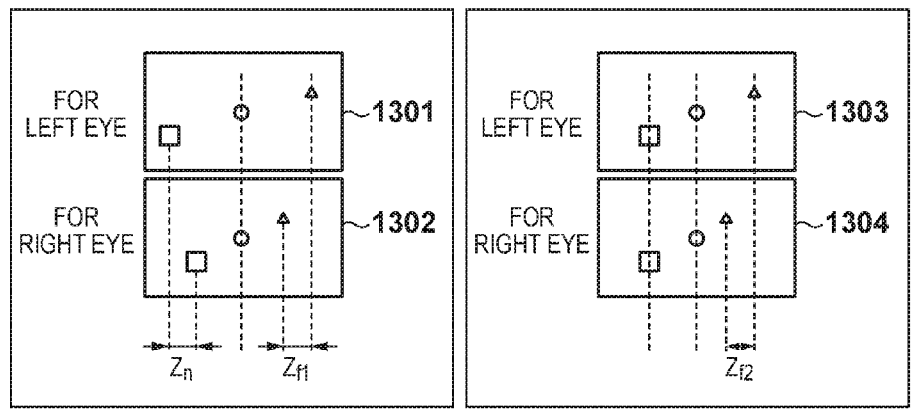
FIG. 13B FIG. 13E
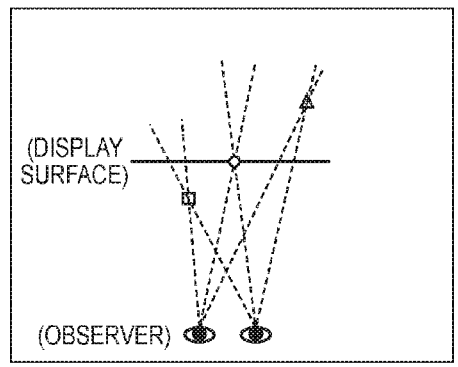
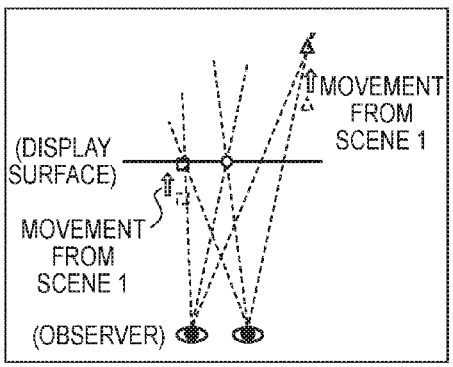
FIG. 13C FIG. 13F
PRIOR ART

IMAGE CAPTURING APPARATUS, METHOD OF CONTROLLING THE SAME AND PROGRAM

CROSS-REFERENCE TO RELATED APPLICATIONS

This application is a national stage application of International Application No. PCT/JP2012/068260, filed Jul. 11, 2012, whose benefit is claimed and which claims the benefit of Japanese Patent Application No. 2011-177743, filed Aug. 15, 2011, whose benefit is also claimed.

TECHNICAL FIELD

The present invention relates to an image capturing apparatus, a method of controlling the same, and a program and, particularly, to a technique of creating an image for binocular stereopsis.

BACKGROUND ART

In recent years, with, for example, an improvement in processing capacity of an arithmetic circuit and an increase in number of pixels in a display region, some kinds of display devices, that is, so-called three-dimensional image display devices (to be referred to as 3D televisions hereinafter) capable of allowing the observer to perceive three-dimensional visual effects are available.

A 3D television often employs, for example, a method of selectively displaying images for left and right eye at a predetermined refresh rate, or simultaneously displaying left- and right-eye images to allow the observer to observe different images with his or her both eyes using an optical member such as a lenticular film. The 3D television displays images or videos represented by images for left and right eye having a given difference (disparity), which allows the observer to perceive depth information.

When humans observe an object upon the occurrence of a disparity as the angle formed by a straight line which connects a subject to each eyeball is larger than the convergence angle formed by the line of sight which connects this eyeball to a gaze point (no disparity), they perceive the object as being in the foreground with respect to the gaze point. However, when humans observe an object upon the occurrence of a disparity as the angle formed by a straight line which connects a subject to each eyeball is smaller than the convergence angle formed by the line of sight which connects this eyeball to a gaze point, they perceive the object as being in the background with respect to the gaze point.

Nowadays, to keep pace with the spread of domestic 3D televisions, domestic image capturing apparatuses (3D cameras) such as digital cameras and digital video cameras have already been put on the market. Under the circumstances, the user has become able to display and browse on a domestic 3D television images or videos captured by himself or herself.

As 3D cameras capable of capturing images for binocular stereopsis, not only a 3D camera which includes two imaging optical systems, for left and right eye, but also that which uses one imaging optical system is available. More specifically, light beams having passed through different regions in the exit pupil of one imaging optical system are independently captured so as to obtain an image equivalent to that for binocular stereopsis obtained by an image capturing apparatus including two imaging optical systems having, as its base-line length, the distance between the centers of gravity of regions through which light beams have passed. This can be achieved by using an image sensor having a composite pixel structure (see FIG. 2) which is used for focus detection of the phase difference detection scheme, includes a plurality of light-receiving elements in each pixel, and forms images of different light beams on the respective light-receiving elements using a microlens, as described in Japanese Patent No. 4027113.

In focus detection of the phase difference detection scheme, light beams having passed through different regions in the exit pupil form, on different pixels, an image of a subject at a focal position and those of subjects in the background and foreground, respectively, with respect to the focal position, as shown in FIGS. 12A to 12C.

When the composite pixel structure of the image sensor includes two horizontally arranged light-receiving elements, the shift in horizontal position of a subject image, which is generated between images A and B output from the light-receiving elements of all pixels, varies for subject images at respective distances, as shown in FIGS. 12D to 12F. In an actual focus detection operation, the outputs from light-receiving elements a and b are used in combination in the column direction (or row direction) as those from pixel cell groups each having the same color to create images A and B and convert them into data, thereby obtaining a shift in corresponding point between images A and B by correlation calculation.

In this manner, when an image sensor having a composite pixel structure is used to create an image for binocular stereopsis from light beams having passed through different regions in the exit pupil of an imaging optical system, a plane in which a gaze point is present in an image capturing apparatus including two imaging optical systems corresponds to a focal position having almost no disparity. That is, when the image capturing apparatus is focused on a main subject to shoot an image using one imaging optical system, the main subject is imaged on almost the same pixels in an image for left eye (image A) and an image for right eye (image B), and naturally has no disparity.

When such an image for binocular stereopsis shot by an image capturing apparatus (monocular image capturing apparatus) including one imaging optical system and an image sensor having a composite structure is displayed, it is hard for the observer to perceive a stereoscopic effect of a main subject because the main subject always has no disparity.

Also, when moving images shot while focusing on a main subject or continuously shot still images are sequentially read out and reproduced on a display device, an image associated with the main subject has no disparity even after the main subject moves, so the disparity of a subject absent at a focal position changes.

In, for example, scene 1, when an image capturing apparatus, a main subject, a near subject, and a far subject have positional relationships as shown in FIG. 13A, an image for left eye 1301 and an image for right eye 1302 are shot as shown in FIG. 13B. As can be seen from the images for left and right eye 1301 and 1302, the near subject in the foreground with respect to the main subject at a focal position, and the far subject in the background with respect to the main subject have horizontal differences (Zn and Zf1) between these images. When such an image for binocular stereopsis is displayed on a display device, the main subject at the focal position has no difference between the captured images for left and right eye, so the observer perceives it as being at the position of the display surface, as shown in FIG. 13C. Also, the observer perceives the near subject and far subject as being in the foreground and background, respectively, with respect to the display surface.

Then, in scene 2, when the main subject moves to the same depth position as that of the near subject while the near subject and far subject stand still, as shown in FIG. 13D, an image for left eye 1303 and an image for right eye 1304 are shot as shown in FIG. 13E. As described above, upon focusing on the main subject, a subject on a plane in which a focal position is present has no disparity, so the near subject and main subject have no differences between the captured images for left and right eye. In contrast to this, the far subject moves away from the focal position in the depth direction, and therefore has a difference Zf2 between the captured images for left and right eye, which is larger than the difference Zf1 between these images in scene 1.

At this time, when the images for left and right eye 1303 and 1304 are displayed on the display device, the observer perceives the main subject and near subject as standing still at the positions defined on the display surface, as shown in FIG. 13F, so it is hard for the observer to perceive the movement of the main subject. That is, the near subject stands still, but nonetheless the observer perceives it as having moved to the position of the display surface where the main subject is present. Also, the far subject stands still, but nonetheless the observer perceives it as having moved to the background with respect to the display surface where the main subject is present.

SUMMARY OF INVENTION

The present invention has been made in consideration of the above-mentioned conventional problem. The present invention provides a technique of allowing the observer to appropriately perceive a stereoscopic effect of a main subject while preventing loss of the disparity of the main subject, upon reproduction of an image for binocular stereopsis created using a light beam having passed through one imaging optical system.

According to one aspect of the present invention, there is provided an image capturing apparatus comprising: one imaging optical system; an image sensor which includes a left-eye light-receiving element and a right-eye light-receiving element, and outputs a left-eye captured image for left eye and a right-eye captured image for right eye upon receiving light beams having passed through the one imaging optical system; detection means for detecting a difference, between the left-eye captured image and the right-eye captured image, of each of subjects included in the left-eye captured image and the right-eye captured image; control means for controlling focusing means of the imaging optical system to focus on a given subject included in the left-eye captured image and the right-eye captured image, based on the difference of the given subject between the left-eye captured image and the right-eye captured image detected by the detection means; and extraction means for creating an image for binocular stereopsis using an extraction image, extracted from a region which includes the given subject and has a predetermined size, for each of the left-eye captured image and the right-eye captured image, wherein the extraction means sets the region so that the difference, between the left-eye captured image and the right-eye captured image, of a subject which is different from the given subject and included in both the extraction images has a predetermined value.

According to another aspect of the present invention, there is provided an image capturing apparatus comprising: one imaging optical system; an image sensor which includes a left-eye light-receiving element and a right-eye light-receiving element, and outputs a left-eye captured image for left eye and a right-eye captured image for right eye upon receiving light beams having passed through the one imaging optical system; detection means for detecting a difference, between the left-eye captured image and the right-eye captured image, of each of subjects included in the left-eye captured image and the right-eye captured image; control means for controlling focusing means of the imaging optical system to focus on a given subject included in the left-eye captured image and the right-eye captured image, based on the difference of the given subject between the left-eye captured image and the right-eye captured image detected by the detection means; and extraction means for creating an image for binocular stereopsis using an extraction image, extracted from a region which includes the given subject and has a predetermined size, for each of the left-eye captured image and the right-eye captured image, the extraction means setting the region so that the difference between the left-eye captured image and the right-eye captured image at a predetermined distance different from a distance between the given subject and the image capturing apparatus has a predetermined value, wherein the extraction means sets the region based on a distance between the centers of gravity of the light beams used to output the left-eye captured image and the right-eye captured image, respectively, a distance between the image sensor and an exit pupil of the one imaging optical system, and the difference between the left-eye captured image and the right-eye captured image at the predetermined distance, which is obtained from the predetermined distance.

According to still another aspect of the present invention, there is provided a method of controlling an image capturing apparatus including one imaging optical system, and an image sensor which includes a left-eye light-receiving element and a right-eye light-receiving element, and outputs a left-eye captured image for left eye and a right-eye captured image for right eye upon receiving light beams having passed through the one imaging optical system, the method comprising: a detection step of detecting a difference, between the left-eye captured image and the right-eye captured image, of each of subjects included in the left-eye captured image and the right-eye captured image; a control step of controlling focusing means of the imaging optical system to focus on a given subject included in the left-eye captured image and the right-eye captured image, based on the difference of the given subject between the left-eye captured image and the right-eye captured image detected in the detection step; and an extraction step of creating an image for binocular stereopsis using an extraction image, extracted from a region which includes the given subject and has a predetermined size, for each of the left-eye captured image and the right-eye captured image, wherein in the extraction step, the region is set so that the difference, between the left-eye captured image and the right-eye captured image, of a subject which is different from the given subject and included in both the extraction images has a predetermined value.

According to still another aspect of the present invention, there is provided a method of controlling an image capturing apparatus including one imaging optical system, and an image sensor which includes a left-eye light-receiving element and a right-eye light-receiving element, and outputs a left-eye captured image for left eye and a right-eye captured image for right eye upon receiving light beams having passed through the one imaging optical system, the method comprising: a detection step of detecting a difference, between the left-eye captured image and the right-eye captured image, of each of subjects included in the left-eye captured image and the right-eye captured image; a control step of controlling focusing means of the imaging optical system to focus on a given subject included in the left-eye captured image and the right-eye captured image, based on the difference of the given subject between the left-eye captured image and the right-eye captured image detected in the detection step; and an extraction step of creating an image for binocular stereopsis using an extraction image, extracted from a region which includes the given subject and has a predetermined size, for each of the left-eye captured image and the right-eye captured image, the extraction step setting the region so that the difference between the left-eye captured image and the right-eye captured image at a predetermined distance different from a distance between the given subject and the image capturing apparatus has a predetermined value, wherein in the extraction step, the region is set based on a distance between the centers of gravity of the light beams used to output the left-eye captured image and the right-eye captured image, respectively, a distance between the image sensor and an exit pupil of the one imaging optical system, and the difference between the left-eye captured image and the right-eye captured image at the predetermined distance, which is obtained from the predetermined distance.

Further features of the present invention will become apparent from the following description of exemplary embodiments with reference to the attached drawings.

BRIEF DESCRIPTION OF DRAWINGS

FIGS. 4A and 4B are views for explaining a method of calculating the difference between images according to the embodiment of the present invention;

Figures 12D, 12E, 12F:
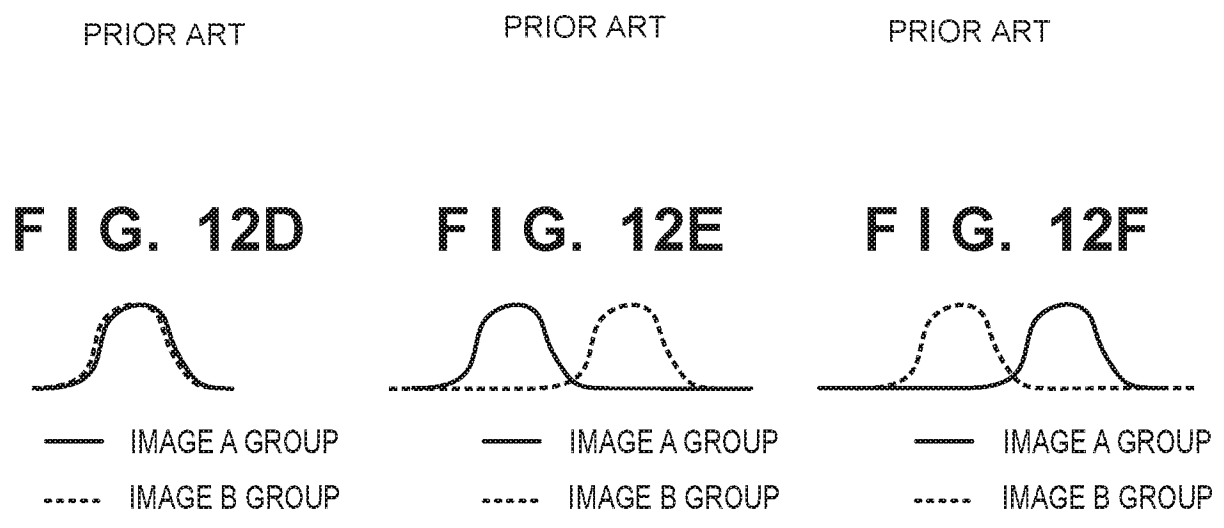

FIGS. 12A, 12B, 12C, 12D, 12E, and 12F are views for explaining focus detection of the phase difference detection scheme; and FIGS. 13A, 13B, 13C, 13D, 13E, and 13F are views for explaining an image for binocular stereopsis, which is captured using an image sensor having a composite pixel structure.

DESCRIPTION OF EMBODIMENTS

[Embodiment]

An exemplary embodiment of the present invention will be described in detail below with reference to the accompanying drawings. Note that an embodiment to be described hereinafter will exemplify an image capturing apparatus by applying the present invention to a digital camera which includes an image sensor having a composite pixel structure, and is capable of creating an image for binocular stereopsis from light beams having passed through different regions in the exit pupil of one imaging optical system. However, the present invention is applicable to an arbitrary apparatus capable of creating an image for binocular stereopsis from light beams having passed through one imaging optical system.

Also, in this specification, "the difference between images" means an amount representing, for each pixel, a shift in relative horizontal position of the same subject in images for left and right eye (left-eye image and right-eye image), which is generated between these images. The difference between images is zero for a subject with no disparity, and has a positive value for a subject farther than that with no disparity, and a negative value for a subject nearer than that with no disparity. Also, "the amount of shift" means an amount representing, for each pixel, a shift in relative horizontal position of a recording pixel region from which an image to be output is extracted in an effective pixel region for each of left- and right-eye captured images.

Note that this embodiment distinguishes between a "captured image" defined by an image signal which is obtained by photoelectric conversion using an image sensor and produces a stereoscopic effect determined in accordance with the setting conditions of an imaging optical system, and an "extraction image" defined by an image signal obtained by extracting a partial region of the captured image for output so as to produce a desired stereoscopic effect.

<Functional Configuration of Digital Camera 100>

Figure 1:
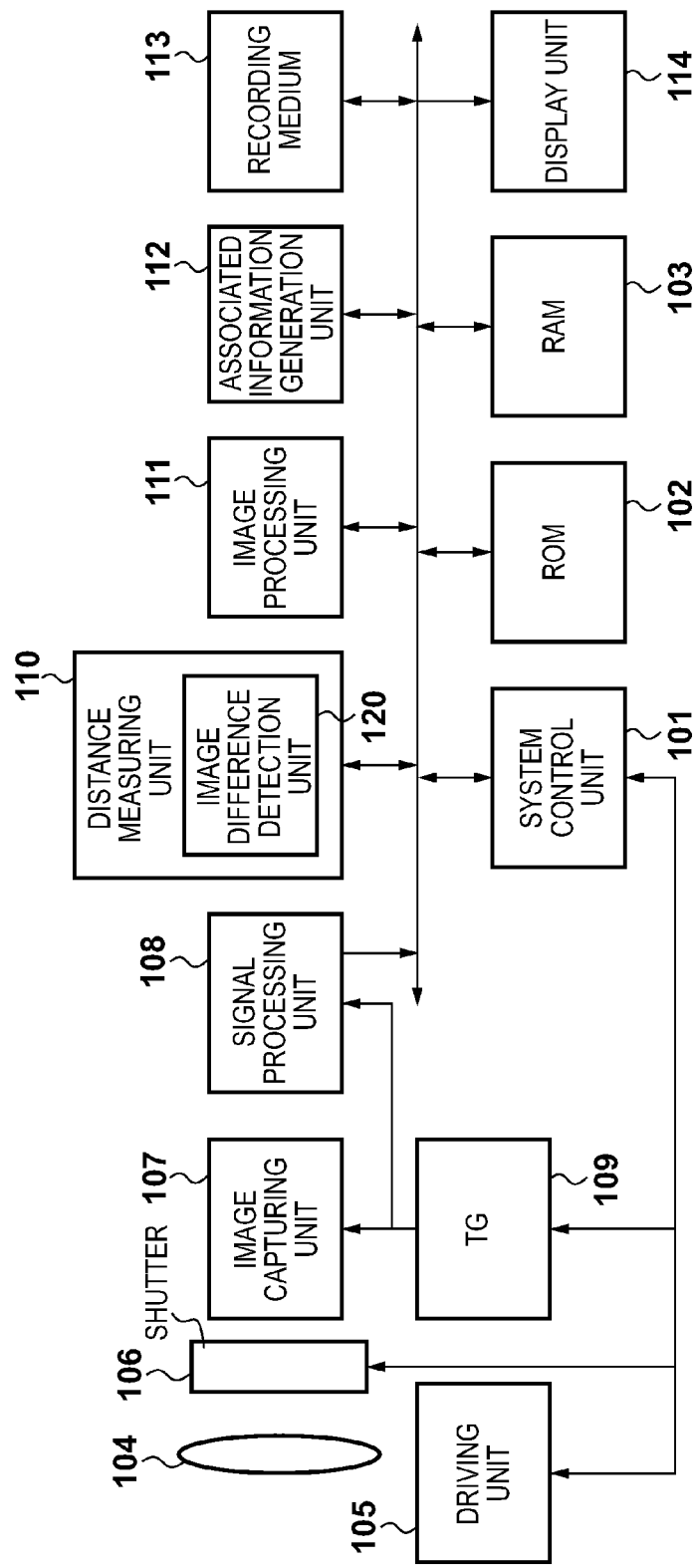
FIG. 1 is a block diagram showing the functional configuration of a digital camera according to an embodiment of the present invention.

FIG. 1 is a block diagram showing the functional configuration of a digital camera 100 according to an embodiment of the present invention.

A system control unit 101 is, for example, a CPU and controls the operation of each block provided in the digital camera 100. More specifically, the system control unit 101 controls the operation of each block by, for example, reading out an operating program for a stereopsis image shooting process (to be described later), which is stored in a ROM 102, expanding it into a RAM 103, and executing it.

The ROM 102 is, for example, a rewritable nonvolatile memory, and stores not only the operating program for a stereopsis image shooting process, but also parameters necessary for the operation of each block of the digital camera 100, or the information of, for example, the image capturing settings of the digital camera 100.

The RAM 103 is a volatile memory, and is used to temporarily store not only an expansion area for the operating program but also, for example, intermediate data output upon the operation of each block of the digital camera 100.

An imaging optical system 104 is a unit formed by, for example, an objective lens, a focusing lens, and a stop, and its lens position and F-number, for example, are controlled by a driving unit 105 in response to a control signal from the system control unit 101. Also, a shutter 106 is a member for controlling the amount of exposure in one-time shooting, and opens/closes at an appropriate timing under the control of the system control unit 101, thereby controlling the time taken to form an image of a light beam incident on an image capturing unit 107 (to be described later) via the imaging optical system 104.

Figure 2:
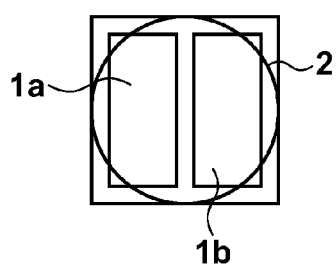
FIG. 2 is a view showing the configuration of a unit pixel of an image sensor according to the embodiment of the present invention.

The image capturing unit 107 is an image sensor such as a CMOS sensor, and photoelectrically converts an optical image formed on the surface of the image sensor by the imaging optical system 104, thereby outputting an analog image signal. In this embodiment, each pixel of the image sensor has a composite pixel structure, which includes two horizontally arranged, left- and right-eye light-receiving elements 1a and 1b, and a microlens 2, as described above with reference to FIG. 2. The image capturing unit 107 photoelectrically converts light beams which have formed images on the respective light-receiving elements and passed through different regions in the exit pupil of the imaging optical system 104, and outputs obtained left- and right-eye analog image signals to a signal processing unit 108.

Although a composite pixel structure including two light-receiving elements in each unit pixel cell will be taken as an example in this embodiment, the practice of the present invention is not limited to this, and a composite pixel structure including three or more light-receiving elements in each unit pixel cell may be adopted. In this case, by, for example, adding the outputs from the respective light-receiving elements provided in each unit pixel cell, two types of separated image signal outputs can be obtained as at least left- and right-eye captured image signals. When, for example, each unit pixel includes four light-receiving elements arranged in a square matrix, left- and right-eye captured image signals can be obtained by adding the outputs from two vertically adjacent light-receiving elements on each of the right and left sides, or by using the output from a light-receiving element selected from those on each of the left and right sides. When each unit pixel includes five light-receiving elements: four light-receiving elements arranged in a square matrix and one light-receiving element at the center, left- and right-eye captured image signals may similarly be obtained using the light-receiving elements other than the central light-receiving element.

The signal processing unit 108 is a signal processing circuit implemented by, for example, an AFE (Analog Front End) and a DFE (Digital Front End), and outputs a digital image signal upon performing various processes for an analog image signal input from the image capturing unit 107. For example, the AFE applies processes such as OB clamping for adjusting the optical black level to a reference level, and an A/D conversion process, thereby converting an analog image signal into a digital image signal (image) and outputting it. Also, the DFE performs various correction processes or a digital process such as sorting, for pixels in left- and right-eye captured images.

Note that the operations of the image capturing unit 107 and signal processing unit 108 are executed in accordance with a timing signal output from a TG (timing generation circuit) 109. The system control unit 101 controls the generation of a timing signal by the TG 109.

A distance measuring unit 110 performs horizontal correlation calculation for the left- and right-eye captured images output from the signal processing unit 108, thereby calculating the amount of defocus of the imaging optical system 104, and outputting it to the system control unit 101. Note that in this embodiment, the distance measuring unit 110 includes an image difference detection unit 120 which performs correlation calculation for the input left- and right-eye captured images to calculate the difference, between these images, of each subject present in these images.

The image difference detection unit 120 calculates the difference generated between the left- and right-eye captured images for each pixel point or each block in a predetermined region obtained by dividing each image into a predetermined number of regions, thereby generating a known disparity map, in which the difference between these images is mapped in an image difference reference image. The disparity map represents the difference of each corresponding point generated between the left- and right-eye captured images due to the difference between regions in the exit pupil, through which light beams forming these images have passed, and the distance of each subject can be estimated using this disparity map.

Figure 3:
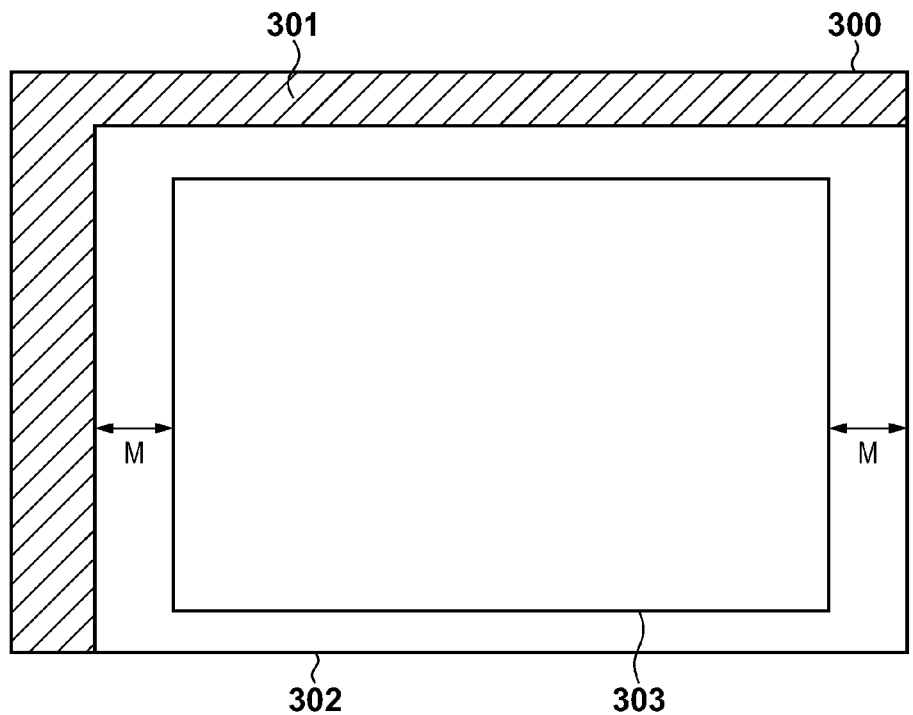
FIG. 3 is a view for explaining the configuration of a captured image according to the embodiment of the present invention.

Each of the left- and right-eye captured images input to the distance measuring unit 110 is formed by an optical black (OB) pixel region 301 serving as a reference in terms of image processing, and an effective pixel region 302, as exemplified in, for example, an image 300 shown in FIG. 3. At this time, for both the left- and right-eye captured images, an image of a basic recording pixel region 303 formed concentrically with the effective pixel region 302 is used as an image for horizontal correlation calculation. A disparity map can be generated by feature point association using, for example, stereo matching.

Note that a region which is not included in the basic recording pixel region 303 of the effective pixel region 302 is a margin region used in adjusting the disparity of a subject in an image for binocular stereopsis to be created. In adjusting the disparity of a subject in an image for binocular stereopsis, at least one of left- and right-eye extraction images is obtained by setting and extracting a recording pixel region having the same size as the basic recording pixel region 303 so that it includes a margin region in the effective pixel region 302. That is, in this embodiment, the position of a recording pixel region from which an image is extracted is horizontally shifted in the effective pixel region 302 of the image signal output from the signal processing unit 108, thereby obtaining an image for binocular stereopsis, which has an adjusted disparity.

(Image Difference Detection Method (Stereo Matching))

Various methods are available for stereo matching. However, feature point association between the left- and right-eye captured images, which uses a simple template matching method based on a difference sum, will be described below.

First, upon defining one of left- and right-eye captured images as a reference image, the basic recording pixel region 303 in the reference image is divided into a predetermined number of (n) blocks 400-1 to 400-n having the same size, as shown in FIG. 4A. Although a region including a plurality of pixels is divided into blocks in this embodiment, one block may be formed by a unit pixel. In the other image (look-up image), the area correlation value of a window having the same size as each block is calculated while horizontally moving the window to search for the position of a pixel corresponding to that of a pixel included in this block, thereby calculating the difference, between the left- and right-eye captured images, of this block in the look-up image.

For example, a point in a right-eye captured image 411 serving as a look-up image, which corresponds to a point of interest 402 $(x, y)$ in a left-eye captured image 401 serving as a reference image, as shown in FIG. 4B, is searched for using as a template an image of a block 403 including the point of interest 402. A corresponding point search region 412 as the range in the right-eye captured image 411, within which the area correlation value is calculated for the template, is determined in accordance with the same coordinate position as the point of interest 402, and a difference K between the left- and right-eye captured images 401 and 411 assumed in the horizontal direction upon defining this coordinate position as a center. Note that in this embodiment, two light-receiving elements are horizontally juxtaposed in each unit pixel of the image sensor, so one-dimensional correlation for only a search in the horizontal direction is calculated.

Each pixel in the corresponding point search region 412 is sequentially selected as a look-up pixel 413, and the degree of similarity with the template is calculated for an image included in a window region 414 which has this pixel as its center and the same area as the template. At this time, the degree of similarity in the vicinity of a corresponding point candidate as the look-up pixel 413 is calculated by the sum of squares of the difference between pixel values as:

$$JSDD = \sum_{i=-K}^{K} (I(x, y) - I_0(x_b + i, y))^2$$

where I(x, y) is the image signal from the point of interest 402 (x, y) in the left-eye captured image 401, $x_b+i$ is the x-coordinate of the look-up pixel 413 in the right-eye captured image 411, and $I_0(x_b+i, y)$ is the image signal from the look-up pixel 413 in the right-eye captured image 411. Note that JSDD is called the "residual sum of squares", and is zero when all the pixel values are the same. That is, a point in the right-eye captured image 411, which corresponds to the point of interest 402 in the left-eye captured image 401, is a pixel $(x_c, y)$ where the JSDD representing the degree of similarity between the image signal from the point of interest 402 and that from the look-up pixel 413 minimizes. This means that a horizontal difference Z of a subject at the point of interest 402 between the left- and right-eye captured images is given by:

$$Z = x - x_c$$

A representative value for the difference between the left- and right-eye captured images in each divided block is determined using the maximum or average value of the differences between the points of interest in the reference image and the corresponding points in the look-up image, which are calculated for all pixels in this divided block. Using the representative values of the differences between the left- and right-eye captured images calculated for all blocks, the image difference detection unit 120 generates a disparity map and outputs it to an image processing unit 111 (to be described later). Note that the generation of a disparity map by the image difference detection unit 120 and the calculation of the amount of defocus by the distance measuring unit 110 may be done simultaneously, or the amount of defocus may be calculated using the disparity map.

The image processing unit 111 executes correction processes such as a color conversion process and an enlargement/reduction process for the left- and right-eye captured images output from the signal processing unit 108. Also, to create extraction images having an adjusted difference between the left- and right-eye captured images, the image processing unit 111 extracts regions having a predetermined size from the above-mentioned images of the effective pixel regions 302. At this time, the system control unit 101 refers to the disparity map to determine the amounts of shift, from the basic recording pixel regions 303, of the recording pixel regions in the effective pixel regions 302, from which left- and right-eye extraction images are extracted.

An associated information generation unit 112 generates associated information, including the information of image difference adjustment and that of camera settings in shooting, for the left- and right-eye extraction images having the difference between the left- and right-eye captured images, which is adjusted by the image processing unit 111, as described above. The associated information is recorded in association with the left- and right-eye extraction images having the adjusted difference between the left- and right-eye captured images, which are created by the image processing unit 111. Note that the information of image difference adjustment may be, for example, the information of the amounts of shift, from the basic recording pixel regions 303, of the recording pixel regions from which left- and right-eye extraction images are extracted, the information of the vertex coordinate positions of the recording pixel regions in the effective pixel regions 302, or the information of the difference between the left- and right-eye extraction images at a reference position (to be described later).

A recording medium 113 is, for example, an internal memory built into the digital camera 100, or a recording device, detachably connected to the digital camera 100, such as a memory card or an HDD. An image for binocular stereopsis captured when the user operates a release button (not shown) is recorded on the recording medium 113 as image data. Note that the recording format of the image data is preferably a multi-picture format (MPO), JPEG format, or moving image file (for example, an AVI file) which requires no post-process. Also, image data for binocular stereopsis may include only image data (extraction images) in the recording pixel regions extracted from the effective pixel regions 302, or data may be recorded for the effective pixel regions or all pixel regions, as in, for example, the RAW format. Note that if image data for binocular stereopsis is not recorded as image data in the recording pixel regions, a reproduction device which reproduces the image data, for example, can extract and display images corresponding to left- and right-eye recording images, in accordance with associated information.

A display unit 114 is a display device such as a compact LCD of the TFT type. The display unit 114 displays as needed image signals output from the signal processing unit 108, thereby functioning as an electronic viewfinder. Note that the display unit 114 may be a display device which allows naked-eye stereopsis.

<Shooting Process>

Figure 5:
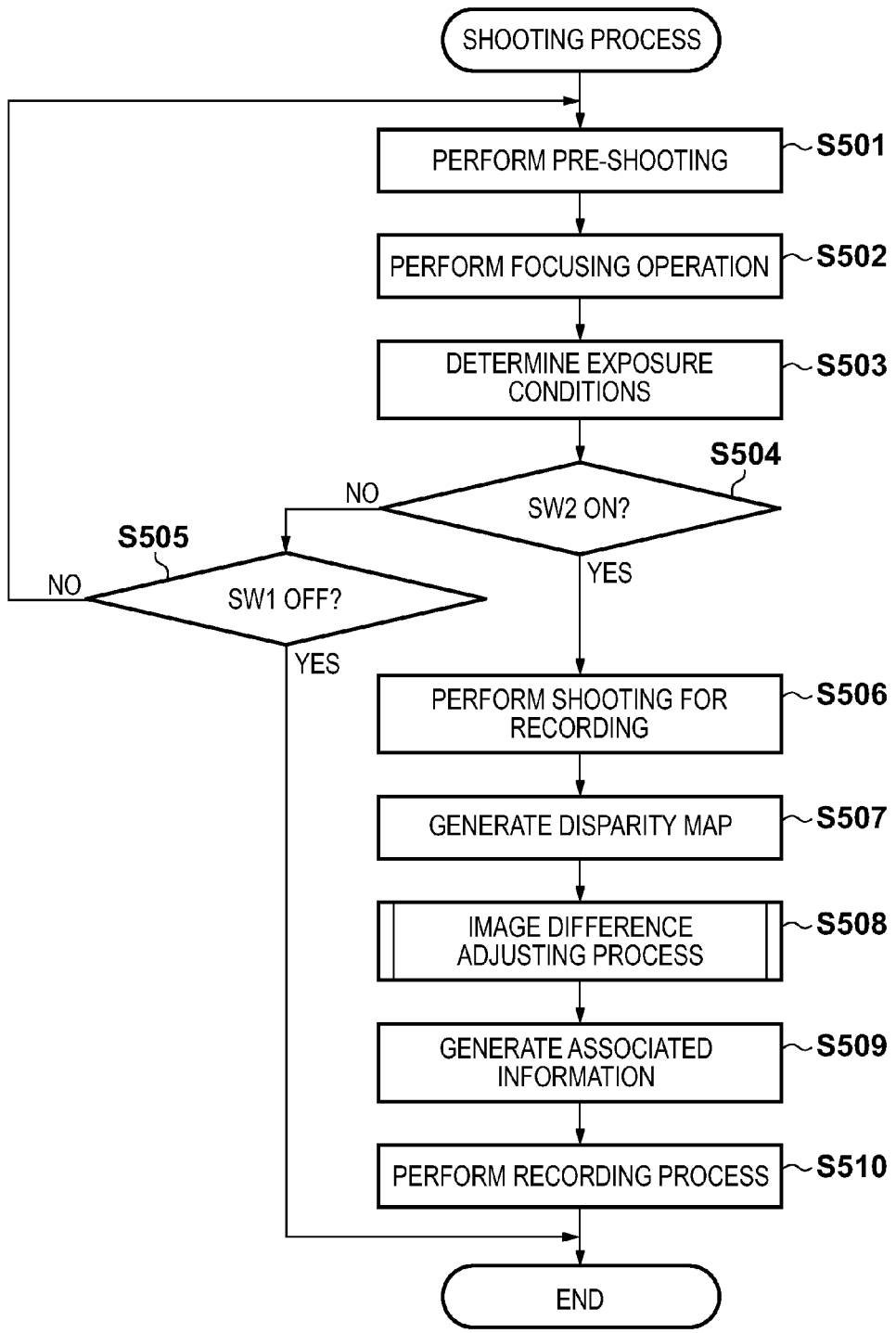
FIG. 5 is a flowchart illustrating an example of a shooting process according to the embodiment of the present invention.

A shooting process by the digital camera 100 with the above-mentioned configuration in this embodiment will be described in detail below with reference to a flowchart shown in FIG. 5. The process corresponding to the flowchart shown in FIG. 5 can be implemented using the system control unit 101 to, for example, read out a corresponding process program stored in the ROM 102, expand it into the RAM 103, and execute it. Note that the following description assumes that this shooting process starts when, for example, the digital camera 100 stands by for shooting upon a half press of the release button (not shown) by the user.

In step S501, the system control unit 101 performs a pre-shooting operation for distance measurement/photometry before an operation of shooting for recording. More specifically, the system control unit 101 controls the TG 109 and shutter 106 to operate the image capturing unit 107 and signal processing unit 108 so as to output left- and right-eye captured images for pre-shooting.

In step S502, the system control unit 101 controls the distance measuring unit 110 to calculate the amount of defocus for each of the left- and right-eye captured images output upon the pre-shooting operation, and controls the driving unit 105 to drive a focusing lens of the imaging optical system 104 so as to focus on the main subject, thereby performing a focusing operation. More specifically, the system control unit 101 controls the distance measuring unit 110 to calculate the amount of defocus for an image included in the basic recording pixel region 303 of each of the left- and right-eye captured images output from the signal processing unit 108 upon the pre-shooting operation. The system control unit 101 determines the driving position of the focusing lens so as to focus on the main subject, in accordance with the information of the amount of defocus output from the distance measuring unit 110, and controls the driving unit 105 to move the focusing lens to the determined driving position.

In step S503, the system control unit 101 determines the exposure conditions in shooting for recording, under which the subject is exposed appropriately, such as the F-number and the exposure time, based on the left- or right-eye captured image output upon the pre-shooting operation.

In step S504, the system control unit 101 determines whether an instruction to perform shooting for recording has been issued upon a full press of the release button (not shown) by the user. More specifically, the system control unit 101 determines whether an instruction to perform shooting for recording has been issued, based on whether it has received an SW2 signal input upon a full press of the release button. If the system control unit 101 determines that the instruction to perform shooting for recording has been issued, the system control unit 101 advances the process to step S506; otherwise, it advances the process to step S505.

In step S505, the system control unit 101 determines whether the user has changed the state of the release button (not shown) from a half-pressed state to a released state. More specifically, the system control unit 101 determines whether the state of the release button has been changed to a released state, based on whether input of an SW1 signal received while the release button is kept half-pressed has stopped. If the system control unit 101 determines that the state of the release button has been changed to the released state, the system control unit 101 ends the shooting process; otherwise, it returns the process to step S501, in which it performs a pre-shooting operation again.

On the other hand, if the system control unit 101 determines that the instruction to perform shooting for recording has been issued in step S504, in step S506 the system control unit 101 performs an operation of shooting for recording under the exposure conditions determined in step S503, thereby obtaining left- and right-eye captured images. Although a shooting process is performed in a still image shooting operation in this embodiment, the practice of the present invention may be applied to a moving image shooting operation. In a moving image shooting operation, the time taken to perform a light-shielding operation by the shutter 106 for each frame cannot be ensured, so a frame having appropriate exposure can be obtained upon slit rolling shutter driving by the image sensor.

In step S507, the system control unit 101 controls the image difference detection unit 120 to generate a disparity map for the left- and right-eye captured images obtained by the operation of shooting for recording. More specifically, the system control unit 101 determines one of the left- and right-eye captured images obtained by the operation of shooting for recording as a reference image, and the other as a look-up image. The system control unit 101 then divides an image included in the basic recording pixel region 303 of the reference image into a predetermined number of blocks, and controls the image difference detection unit 120 to calculate the difference between the left- and right-eye captured images, in the basic recording pixel region 303 of the look-up image in each block, thereby generating a disparity map.

In step S508, the system control unit 101 executes an image difference adjusting process for creating an image for binocular stereopsis, which allows the observer to perceive an appropriate stereoscopic effect of a main subject having no disparity, using the disparity map generated by the image difference detection unit 120 in step S507.

(Image Difference Adjusting Process)

Figure 6:
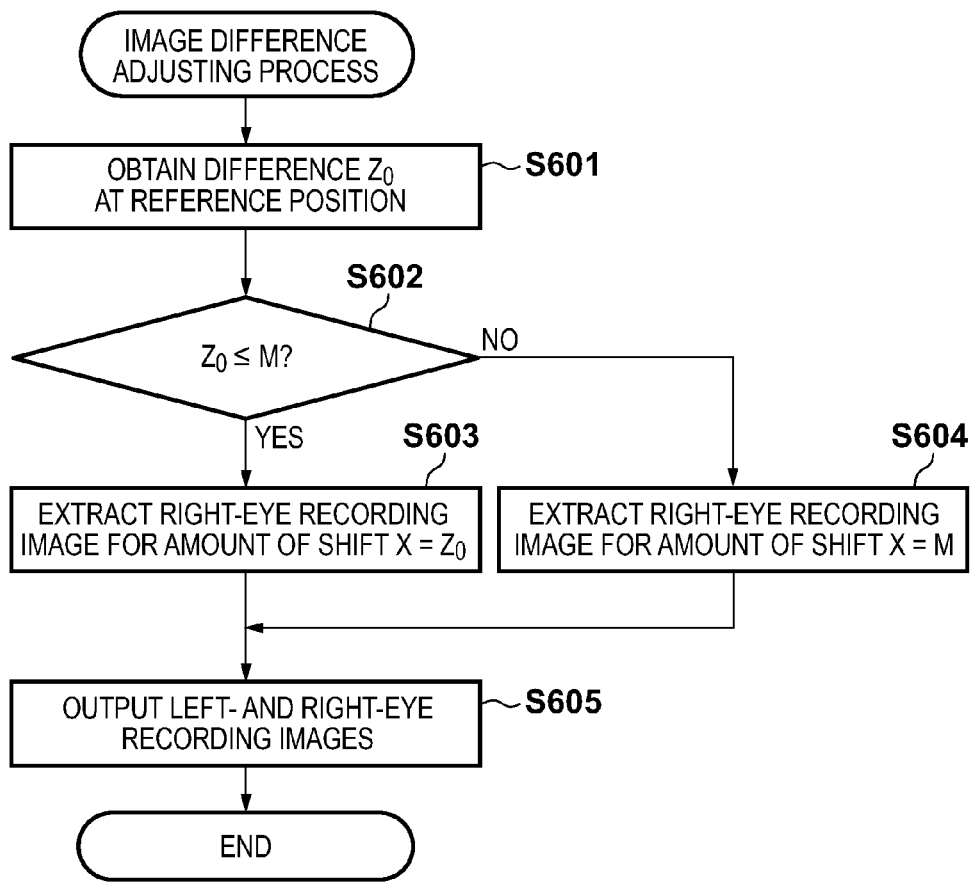
FIG. 6 is a flowchart illustrating an example of an image difference adjusting process according to the embodiment of the present invention.

An image difference adjusting process will be described hereinafter with reference to a flowchart shown in FIG. 6.

In step S601, the system control unit 101 determines a reference position (block) in a reference image, in which a subject having a disparity to be eliminated is present, in an image for binocular stereopsis to be created, thereby obtaining a difference $Z_0$ between the left- and right-eye captured images at the reference position from the disparity map. In this embodiment, one of candidate blocks including a subject in the background with respect to the main subject is selected as a reference position. A method of selecting a block as a reference position may be, for example, a method of presenting candidate blocks to the user to allow him or her to select one of them, or a method of automatically selecting a block having a subject with a maximum difference between images within the depth of field. Note that in the following description, a block having a subject with a maximum difference between the left- and right-eye captured images within the depth of field is selected as a reference position, and the subject at the selected reference position will be referred to as a farthest subject.

In the following steps, to create an image for binocular stereopsis, in which the farthest subject at the reference position selected in this way has no disparity, the position of a recording pixel region from which an extraction image is extracted is determined from the effective pixel region 302 of the right-eye captured image serving as a look-up image.

In step S602, the system control unit 101 determines whether the difference $Z_0$ of the farthest subject between the left- and right-eye captured images at the reference position is not larger than a horizontal width M of a margin region within which the recording pixel region can be shifted in the effective pixel region 302, as shown in FIG. 3.

In this embodiment, if the left-eye extraction image of the image for binocular stereopsis to be output finally is an image extracted from the basic recording pixel region 303, an amount of shift X, from the basic recording pixel region 303, of the recording pixel region from which a right-eye extraction image is extracted is limited to the horizontal width M of the margin region. That is, in this step, when the amount of shift X, from the basic recording pixel region 303, of the recording pixel region from which a right-eye extraction image is extracted is set to the difference $Z_0$ between the left- and right-eye captured images to eliminate the disparity of the farthest subject, it is determined whether the amount of shift X is equal to or smaller than the horizontal width M of the margin region. This means that in this step, the system control unit 101 determines whether it is possible to create an image for stereopsis, in which the farthest subject has no disparity.

If the system control unit 101 determines that the difference $Z_0$ is not larger than a horizontal width M of a margin region, the system control unit 101 advances the process to step S603; otherwise, it advances the process to step S604.

In step S603, the system control unit 101 extracts, as a right-eye extraction image, an image of an extraction pixel region formed at a position shifted by $Z_0$ from the basic recording pixel region 303 in the effective pixel region 302 of the right-eye captured image serving as a look-up image. That is, upon execution of the process in this step, the system control unit 101 can obtain a right-eye extraction image having a difference between the left- and right-eye captured images, which is adjusted to zero for the farthest subject. Note that the system control unit 101 outputs the information of the amount of shift ($X=Z_0$) at this time to the associated information generation unit 112.

On the other hand, if the system control unit 101 determines that the difference $Z_0$ is larger than a horizontal width M of a margin region in step S602, in step S604 the system control unit 101 extracts, as a right-eye extraction image, an image of a recording pixel region formed at a position shifted by M from the basic recording pixel region 303 in the effective pixel region of the right-eye captured image. That is, upon execution of the process in this step, the system control unit 101 can obtain a right-eye extraction image having a difference between the left- and right-eye captured images, which is adjusted to be as close to zero as possible for the farthest subject. Note that the system control unit 101 outputs the information of the amount of shift (X=M) at this time to the associated information generation unit 112.

In step S605, the system control unit 101 outputs to the image processing unit 111 the left-eye extraction image extracted from the basic recording pixel region 303 of the left-eye captured image, and the right-eye extraction image extracted from the recording pixel region shifted by the amount of shift X from the basic recording pixel region 303 in the effective pixel region 302 of the right-eye captured image.

In this manner, the image difference adjusting process makes it possible to obtain left- and right-eye extraction images for binocular stereopsis having a difference between the left- and right-eye captured images, which is adjusted to zero not for the main subject but for the subject at the set reference position.

Note that in this embodiment, an extraction image is extracted from the basic recording pixel region 303 in a captured image, which is set as a reference image, of left- and right-eye captured images, and an extraction image is extracted from a shifted recording pixel region from only a captured image set as a look-up image. However, the practice of the present invention is not limited to this, and any configuration can be adopted as long as the shift in relative horizontal position of a recording pixel region from which an extraction image is extracted for each of left- and right-eye captured images finally becomes as close to the difference of the farthest subject between the left- and right-eye captured images as possible.

For example, an extraction image for each eye may be extracted from a recording pixel region formed at a position shifted from the basic recording pixel region 303 in each captured image by a value corresponding to a half of the difference $Z_0$ or one of two parts obtained by dividing the difference $Z_0$ at an arbitrary ratio, between the left- and right-eye captured images, of the farthest subject obtained from the disparity map.

Also, for example, when an extraction image is extracted from a recording pixel region shifted from the basic recording pixel region 303 by M, that is, a shift limit lower than the difference $Z_0$ of the farthest subject between the left- and right-eye captured images in the look-up image, the following operation may be done. That is, an extraction image may be extracted from a recording pixel region shifted from the basic recording pixel region 303 by $Z_0-M$ so that the difference of the farthest subject between the left- and right-eye captured images becomes zero.

On the other hand, when the difference of the subject at the reference position between the left- and right-eye captured images cannot be set to zero even if recording pixel regions from which left- and right-eye extraction images are extracted are shifted up to shift limits ($Z_0>2M$), the following operation may be done. For example, left- and right-eye extraction images may be extracted from the basic recording pixel regions 303 of left- and right-eye captured images without adjusting the difference between the left- and right-eye captured images. Also, for example, when the user sets a subject having a difference of zero between the left- and right-eye captured images, or a reference position at which the subject is present, a notification that a process of adjusting the difference of the subject between the left- and right-eye captured images to zero is impossible may be sent.

In step S509, the system control unit 101 controls the associated information generation unit 112 to generate associated information including the information of image difference adjustment, for the left- and right-eye extraction images. Note that the information of image difference adjustment may be at least one of the information of the amounts of shift, from the basic recording pixel regions 303, of the recording pixel regions from which left- and right-eye extraction images are extracted for the left- and right-eye captured images, the information of the coordinate positions of the recording pixel regions in the effective pixel regions 302, and the information of the difference between the left- and right-eye extraction images at the reference position, as described above. Also, the associated information may include setting information associated with shooting, such as the exposure time and the F-number, in an operation of shooting for recording.

Figure 11A:
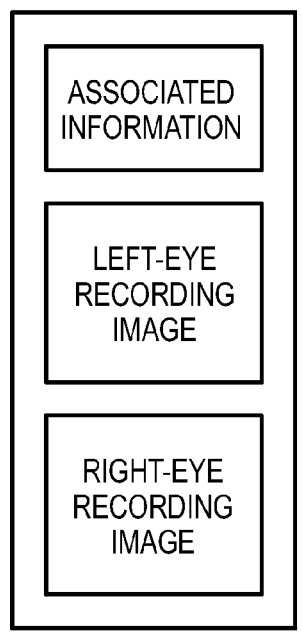
FIGS. 11A and 11B are views showing the recording format of image data for binocular stereopsis according to the embodiment of the present invention.
Figure 11B:
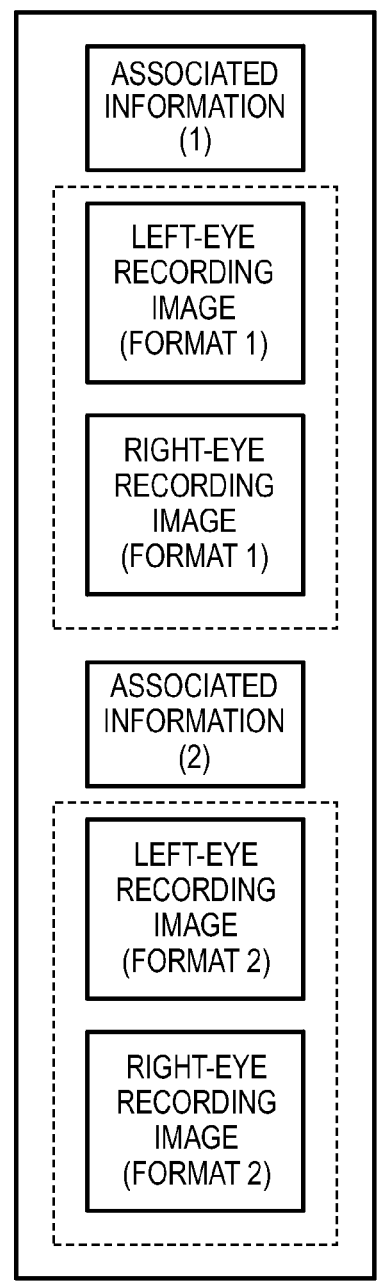

In step S510, the system control unit 101 adds the associated information generated by the associated information generation unit 112 to the left- and right-eye extraction images obtained by the image difference adjusting process in step S508, records the obtained data in the recording medium 113 as image data for binocular stereopsis, and ends the shooting process. Note that the recording format of the image data for binocular stereopsis recorded on the recording medium at this time may be that formed by associated information and left- and right-eye extraction images, as shown in, for example, FIG. 11A. Alternatively, the recording format of the image data for binocular stereopsis recorded on the recording medium at this time may be that formed by associated information, JPEG images serving as left- and right-eye extraction images, and RAW images serving as images of the effective pixel regions 302 of left- and right-eye captured images, as shown in, for example, FIG. 11B. In this case, independent pieces of associated information may be recorded for the JPEG and RAW images, respectively.

(Relationship between Amount of Defocus and Difference between Images)

How to perform adjustment in the above-mentioned image difference adjusting process will be explained in more detail in terms of the amount of defocus and the difference between images.

Figure 7A:
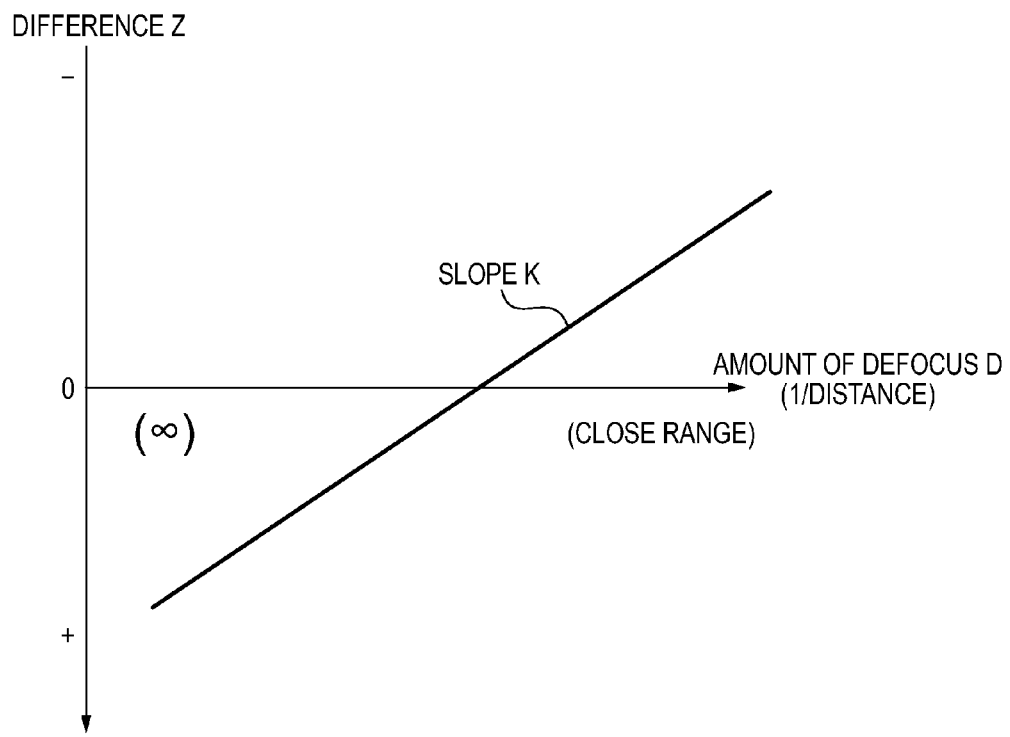
FIGS. 7A and 7B are views for explaining the relationship between the amount of defocus and the difference between images.
Figure 7B:
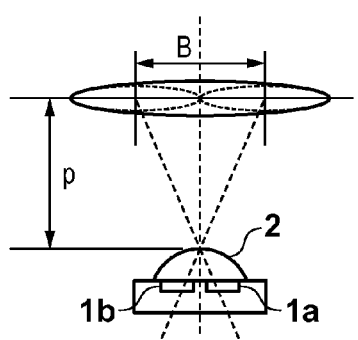

The amount of defocus (the reciprocal of the distance between the subject and the digital camera 100), and the difference between left- and right-eye images are proportional to each other, as shown in FIG. 7A. That is, an amount of defocus D is given by:

$$D = K \times Z + H$$

where Z is the difference of an arbitrary subject generated between left- and right-eye images, H is a hyperfocal offset, and K is a proportionality coefficient calculated as:

$$K = B/p$$

where B is the distance between the centers of gravity of light beams in the exit pupil of the imaging optical system 104, through which the light beams pass to form left- and right-eye subject images, and p is the distance between this exit pupil and the image sensor, as shown in FIG. 7B. However, because individual imaging optical systems 104 used generate, for example, vignetting with different properties due to factors associated with their structures and lens aberrations, the proportionality coefficient K is preferably stored in the storage area of the imaging optical system 104 or digital camera 100 in advance, instead of calculating it using the above-mentioned equation.

Figure 8:
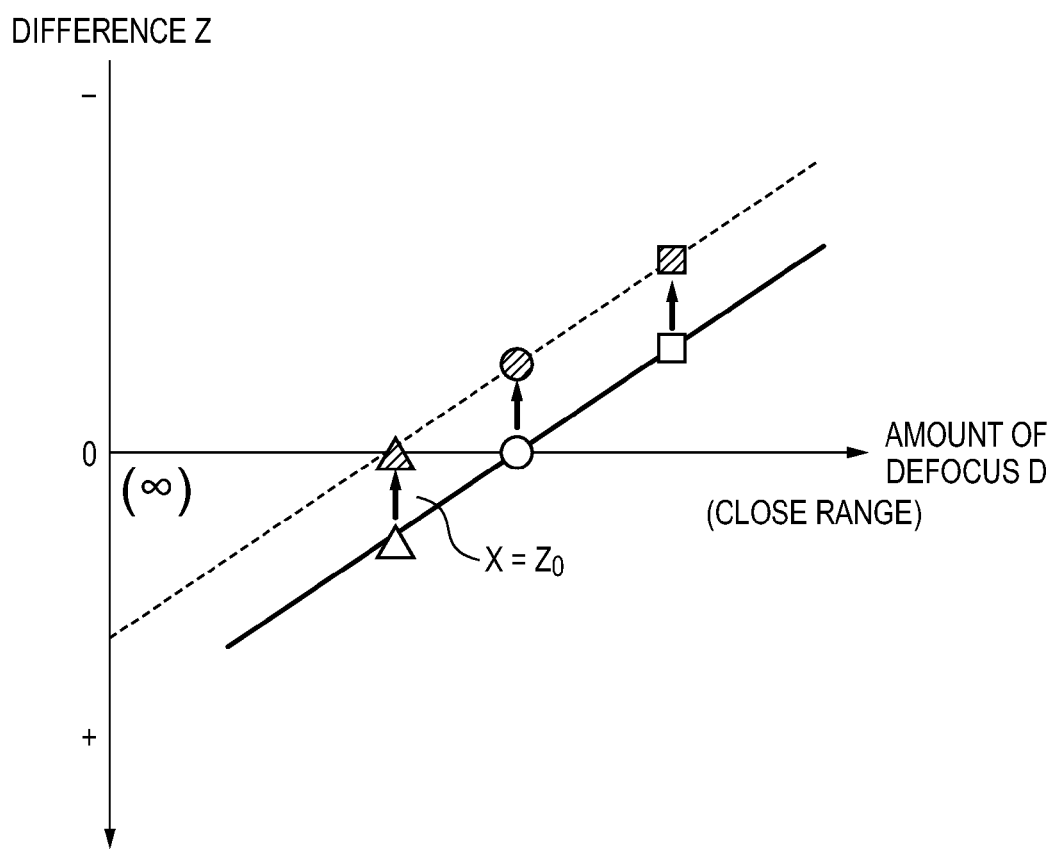
FIG. 8 is a graph for explaining the image difference adjusting process according to the embodiment of the present invention.

When the distribution of the difference between left- and right-eye captured images obtained by an operation of shooting for recording is as shown in, for example, FIG. 7A, the distribution of the difference between left- and right-eye extraction images obtained by executing an image difference adjusting process is as indicated by a broken line in FIG. 8. That is, to adjust the difference between the left- and right-eye captured images to zero upon execution of an image difference adjusting process for a farthest subject farther than a main subject having a difference of zero between the left- and right-eye captured images in FIG. 7A, this process is executed to satisfy a relation between an amount of defocus D' and a difference Z between the left- and right-eye captured images as:

$$D' = K \times Z + H - Z_0$$

where $Z_0$ is the difference between the left- and right-eye captured images before the farthest subject is processed.

Figure 9A:
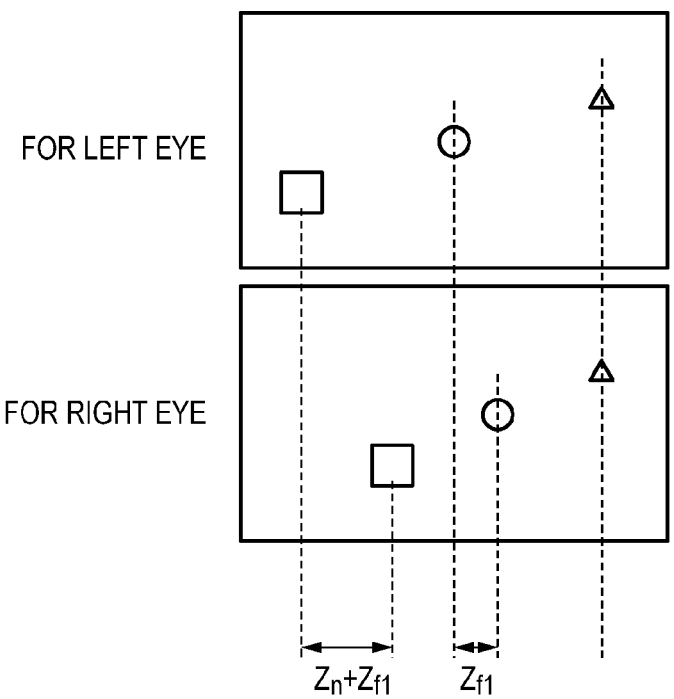
FIGS. 9A and 9B are other views for explaining the image difference adjusting process according to the embodiment of the present invention.
Figure 9B:
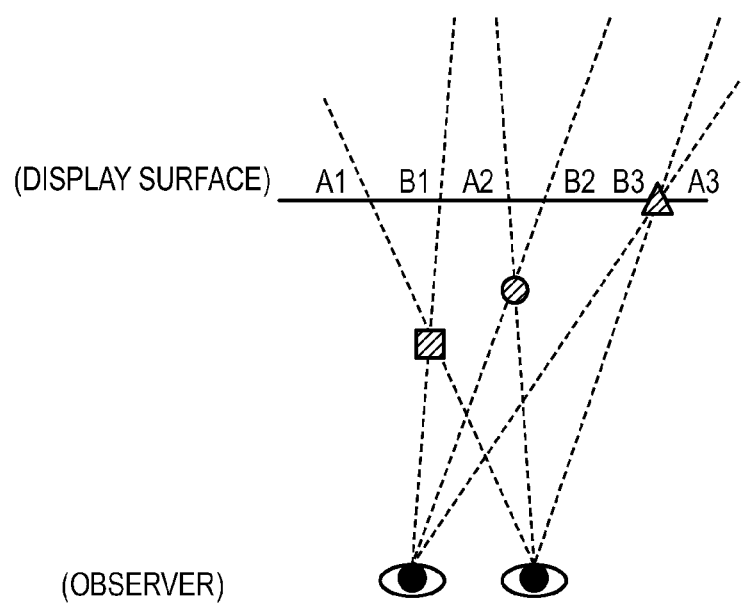

In this manner, in creating an image for binocular stereopsis using light beams having passed through different regions in the exit pupil of the imaging optical system, the difference between the left- and right-eye captured images is adjusted to zero for a subject having a depth different from that of the main subject, thereby allowing the observer to perceive an appropriate stereoscopic effect of the main subject. When the positional relationships among the image capturing apparatus, the mains subject, the near subject, and the far subject are the above-mentioned ones, as shown in, for example, FIG. 13A, an image difference adjusting process is executed so that the difference of the far subject between the left- and right-eye captured images becomes zero, thereby obtaining left- and right-eye extraction images, as shown in FIG. 9A. When the thus adjusted left- and right-eye extraction images are displayed using a display device which allows binocular stereopsis, the display device allows the observer to perceive a stereoscopic effect with which the main subject is present in the foreground with respect to the display surface, as shown in FIG. 9B.

As described above, the image capturing apparatus in this embodiment can allow the observer to appropriately perceive a stereoscopic effect of a main subject upon reproduction of an image for binocular stereopsis created using light beams having passed through different regions in the exit pupil of one imaging optical system. More specifically, the image capturing apparatus receives light beams having passed through one imaging optical system, outputs left- and right-eye captured images, and detects the difference, between these images, of each of subjects included in these images. The image capturing apparatus then outputs an extraction image extracted from a region, which includes the main subject and has a predetermined size, for each of the left- and right-eye captured images. At this time, the region is set so that the difference, between the left- and right-eye captured images, of a subject different from the main subject included in both the extraction images has a predetermined value.

Figure 10A:
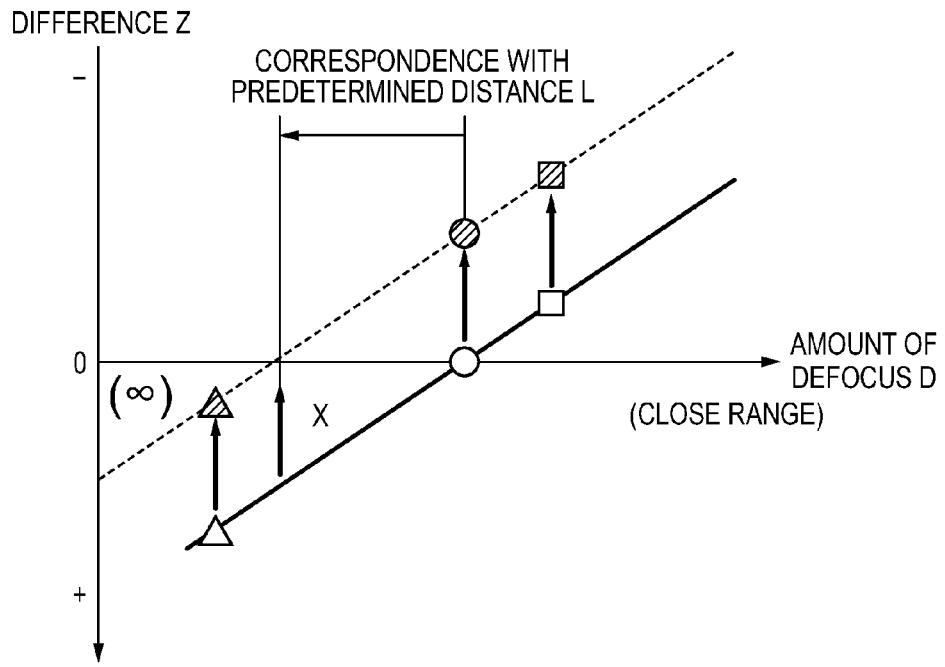
FIGS. 10A and 10B are graphs for explaining a modification of the image difference adjusting process according to the embodiment of the present invention.
Figure 10B:
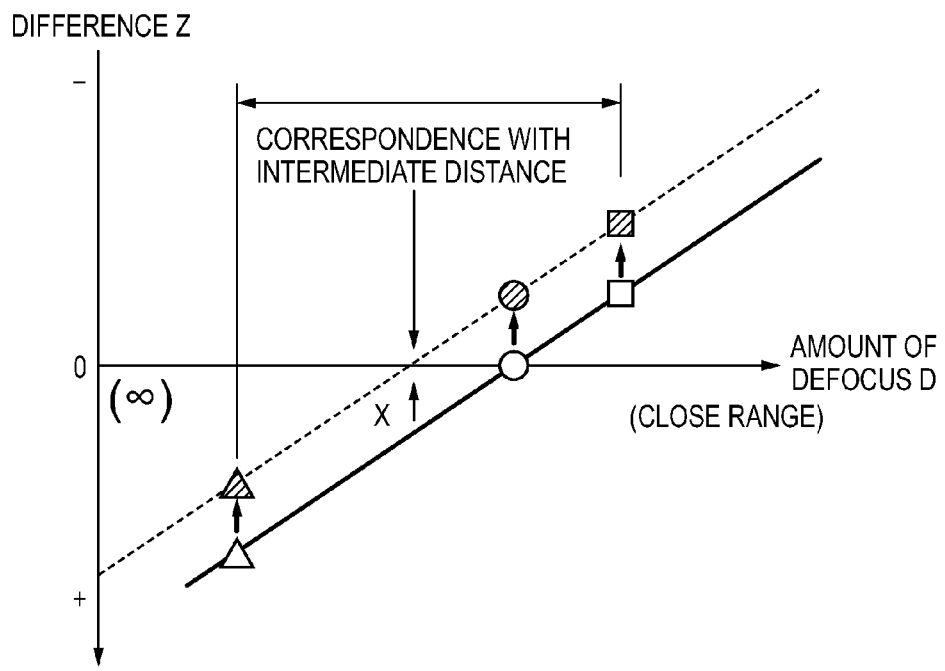

Although an image difference adjusting process is executed so that the difference of a farthest subject at a reference position between the left- and right-eye captured images becomes zero in this embodiment, the practice of the present invention is not limited to this. An image difference adjusting process may be executed so that a disparity is lost at a position spaced apart in the depth direction by a predetermined distance L from the calculated distance of the main subject from the image capturing apparatus, as shown in, for example, FIG. 10A. Also, an image difference adjusting process may be executed by calculating the distances between the image capturing apparatus and the nearest subject and farthest subject detected within the depth of field so that a disparity is lost at the intermediate distance between these two subjects, as shown in, for example, FIG. 10B. Note that in the two examples given herein, when the difference between the left- and right-eye captured images is to be adjusted to eliminate a disparity in a plane spaced apart from the image capturing apparatus by a specific distance, no subject may be present at this distance, so the amount of shift X can be determined using the relation between the amount of defocus and the difference between the left- and right-eye captured images.

Also, although the difference of the farthest subject at the reference position between the left- and right-eye captured images is adjusted to zero in this embodiment, the practice of the present invention is not limited to this. That is, the present invention may adopt any configuration as long as it determines the amount of shift X to adjust the recording pixel region so that a subject at a depth position different from that of the main subject has a predetermined difference between the left- and right-eye captured images.

[Modification 1]

Although how to shoot a still image for binocular stereopsis has been explained in the above-mentioned embodiment, the present invention is also applicable when images are continuously captured as in, for example, continuous shooting or moving image shooting.

In still image shooting, as in the first embodiment, the difference of the subject at the set reference position between the left- and right-eye captured images is adjusted to zero, thereby allowing the observer to appropriately perceive a stereoscopic effect of the main subject. However, in continuous shooting or moving image shooting, the shooting time is longer than in still image shooting, so the subject at the set reference position may move. In this case, an image for binocular stereopsis as each extraction image in continuous shooting or each frame in moving image shooting, which is obtained by executing an image difference adjusting process, may have a stereoscopic effect of the main subject, which varies across continuous images or frames, despite shooting an image of the same subject. That is, even if, for example, the main subject stands still, the stereoscopic effect of the main subject may change in response to a change in distance between the image capturing apparatus and the subject at the reference position. The stereoscopic effect of the main subject may also change when another subject is determined as the subject at the reference position upon movement of the subject at the reference position, and the difference of the other subject between the left- and right-eye captured images is adjusted.

To avoid this problem, upon setting of, for example, a continuous shooting or a moving image shooting mode, the system control unit 101 may control a shooting process and an image difference adjusting process in the following way. The system control unit 101 need only obtain the difference between left- and right-eye captured images at a reference position in pre-shooting, and perform an image difference adjusting process for left- and right-eye captured images, obtained by continuous shooting or moving image shooting during shooting for recording, using the amount of shift determined based on the obtained difference between the images. That is, upon setting of a continuous shooting or moving image shooting mode, the system control unit 101 need only perform an image difference adjusting process during shooting for recording, using the amount of shift in fixed value.

Upon this operation, even when images are captured continuously, the stereoscopic effect of the main subject can be prevented from unnaturally varying across the captured images.

Also, the system control unit 101 may detect a subject standing still during pre-shooting to determine a region including the subject as a reference position. More specifically, the system control unit 101 may, for example, perform image capturing a plurality of times during pre-shooting, and detect the motion vector of a subject across a series of images obtained by the image capturing, thereby determining as a reference position a block corresponding to a region in which a subject having a motion vector equal to or less than a threshold is present. Note that in this case, the amount of shift calculated in an image difference adjusting process may have a fixed value or be obtained from a disparity map as needed.

[Modification 2]

Also, the cause of a variation in stereoscopic effect of the main subject in an image or frame for binocular stereopsis obtained by continuous shooting or moving image shooting is not limited to the movement of the subject at the reference position. As described above, because the shooting time is longer in continuous shooting and moving image shooting than in still image shooting, the same problem as in the case wherein the subject at the reference position moves may be posed due, for example, to a camera shake by the photographer who grips the image capturing apparatus or a change in composition upon a pan operation.

That is, although an image difference adjusting process is performed using an amount of shift, which brings the difference of the subject at the reference position between the left- and right-eye images captured during pre-shooting to zero in Modification 1, the distance between the image capturing apparatus and the subject at the reference position during pre-shooting may change if the image capturing apparatus itself moves. This means that the distances between the digital camera 100 and all subjects in the captured image naturally change, so the stereoscopic effect of the main subject may vary even when an image difference adjusting process is performed using the amount of shift determined upon pre-shooting.

To avoid this problem, upon setting of, for example, a continuous shooting or a moving image shooting mode, the system control unit 101 may control a shooting process and an image difference adjusting process in the following way. The system control unit 101 registers, as a pattern, a feature amount extracted for a subject at a reference position set in pre-shooting. The system control unit 101 then need only search for the position of the subject using the registered pattern during shooting for recording in continuous shooting or moving image shooting, and obtain the difference between the left- and right-eye captured images at the found position from a disparity map, thereby performing an image difference adjusting process.

Upon this operation, the user can always perceive the same subject as being on the display surface when this subject is displayed so that the difference between the left- and right-eye captured images becomes zero, that is, binocular stereopsis becomes possible, thereby preventing the stereoscopic effect of the main subject from unnaturally varying across the captured images even if the digital camera 100 moves during shooting.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-177743, filed Aug. 15, 2011, which is hereby incorporated by reference herein in its entirety.

The invention claimed is:

1. An image capturing apparatus comprising:
an image sensor which includes a left-eye light-receiving element and a right-eye light-receiving element, and outputs a left-eye captured image for left eye and a right-eye captured image for right eye upon receiving light beams having passed through one imaging optical system; and
one or more processors configured to function as the following units:
a detection unit which is able to detect a difference, between the left-eye captured image and the right-eye captured image, of each of subjects included in the left-eye captured image and the right-eye captured image;
a control unit which is able to control a focusing unit of the imaging optical system to focus on a given subject included in the left-eye captured image and the right-eye captured image, based on the difference of the given subject between the left-eye captured image and the right-eye captured image detected by the detection unit; and
a creation unit which is able to create an image for binocular stereopsis using the left-eye captured image and the right-eye captured image,
wherein the creation unit creates the image for binocular stereopsis so that a difference, between the left-eye captured image and the right-eye captured image, of a subject which is different from the given subject and is included in both the left-eye captured image and the right-eye captured image has a predetermined value in the image for binocular stereopsis.

2. The apparatus according to claim 1, wherein the subject different from the given subject is a subject positioned farther from the image capturing apparatus than the given subject.

3. The apparatus according to claim 1, wherein the subject different from the given subject is a subject, which is determined to stand still across a plurality of captured images obtained before the left-eye captured image and the right-eye captured image are obtained, among the subjects included in the left-eye captured image and the right-eye captured image.

4. The apparatus according to claim 1, wherein the subject different from the given subject is a subject having a maximum difference among differences, between a left-eye captured image and a right-eye captured image obtained during pre-shooting before shooting for recording, of the subjects which are detected by the detection unit.

5. The apparatus according to claim 1, wherein the left-eye light-receiving element and the right-eye light-receiving element receive light beams having passed through different regions in the exit pupil of the one imaging optical system.

6. The apparatus according to claim 1, wherein the creation unit creates the image for binocular stereopsis based on extraction images, extracted from regions which include the given subject and have a predetermined size, for each of the left-eye captured image and the right-eye captured image,
wherein the creation unit sets the region so that the difference, between the left-eye captured image and the right-eye captured image, of a subject which is different from the given subject and is included in both the extraction images has a predetermined value in the image for binocular stereopsis.

7. The apparatus according to claim 6, wherein when at least one of the regions set for the left-eye captured image and the right-eye captured image falls outside a range of an effective pixel of the image sensor, the creation unit sets the region within the range of the effective pixel.

8. The apparatus according to claim 6, wherein when at least one of the regions set for the left-eye captured image and the right-eye captured image falls outside a range of an effective pixel of the image sensor, the creation unit sets the region to eliminate the difference of the given subject between the left-eye captured image and the right-eye captured image.

9. The apparatus according to claim 1, wherein the image sensor has microlens array in which each microlens corresponds a plurality of light-receiving elements.

10. The apparatus according to claim 1, wherein the difference between the left-eye captured image and the right-eye captured image means an amount representing, for each pixel, a shift in relative horizontal position of the same subject in the left-eye captured image and the right-eye captured image.

11. An image capturing apparatus comprising:
an image sensor which includes a left-eye light-receiving element and a right-eye light-receiving element, and outputs a left-eye captured image for left eye and a right-eye captured image for right eye upon receiving light beams having passed through one imaging optical system; and
one or more processors configured to function as the following units:
a detection unit which is able to detect a difference, between the left-eye captured image and the right-eye captured image, of each of subjects included in the left-eye captured image and the right-eye captured image;
a control unit which is able to control a focusing unit of the imaging optical system to focus on a given subject included in the left-eye captured image and the right-eye captured image, based on the difference of the given subject between the left-eye captured image and the right-eye captured image detected by the detection unit; and
a creation unit which is able to create an image for binocular stereopsis using an extraction image, extracted from a region which includes the given subject and has a predetermined size, for each of the left-eye captured image and the right-eye captured image, the creation unit setting the region so that the difference, between the left-eye captured image and the right-eye captured image, at a predetermined distance different from a distance between the given subject and the image capturing apparatus has a predetermined value in the image for binocular stereopsis,
wherein the creation unit sets the region based on a distance between the centers of gravity of the light beams used to output the left-eye captured image and the right-eye captured image, respectively, a distance between the image sensor and an exit pupil of the one imaging optical system, and the difference between the left-eye captured image and the right-eye captured image at the predetermined distance, which is obtained from the predetermined distance.

12. A method of controlling an image capturing apparatus including an image sensor which includes a left-eye light-receiving element and a right-eye light-receiving element, and outputs a left-eye captured image for left eye and a right-eye captured image for right eye upon receiving light beams having passed through the one imaging optical system, the method comprising:
a detection step of detecting a difference, between the left-eye captured image and the right-eye captured image, of each of subjects included in the left-eye captured image and the right-eye captured image;
a control step of controlling a focusing unit of the imaging optical system to focus on a given subject included in the left-eye captured image and the right-eye captured image, based on the difference of the given subject between the left-eye captured image and the right-eye captured image detected in the detection step; and
a creation step of creating an image for binocular stereopsis using the left-eye captured image and the right-eye captured image,
wherein in the creation step, the image for binocular stereopsis is created so that the difference, between the left-eye captured image and the right-eye captured image, of a subject which is different from the given subject and is included in both the left-eye captured image and the right-eye captured image has a predetermined value in the image for binocular stereopsis.

13. A method of controlling an image capturing apparatus including an image sensor which includes a left-eye light-receiving element and a right-eye light-receiving element, and outputs a left-eye captured image for left eye and a right-eye captured image for right eye upon receiving light beams having passed through the one imaging optical system, the method comprising:
a detection step of detecting a difference, between the left-eye captured image and the right-eye captured image, of each of subjects included in the left-eye captured image and the right-eye captured image;
a control step of controlling a focusing unit of the imaging optical system to focus on a given subject included in the left-eye captured image and the right-eye captured image, based on the difference of the given subject between the left-eye captured image and the right-eye captured image detected in the detection step; and
a creation step of creating an image for binocular stereopsis using an extraction image, extracted from a region which includes the given subject and has a predetermined size, for each of the left-eye captured image and the right-eye captured image, the creation step setting the region so that the difference between the left-eye captured image and the right-eye captured image at a predetermined distance different from a distance between the given subject and the image capturing apparatus has a predetermined value in the image for binocular stereopsis, wherein in the creation step, the region is set based on a distance between the centers of gravity of the light beams used to output the left-eye captured image and the right-eye captured image, respectively, a distance between the image sensor and an exit pupil of the one imaging optical system, and the difference between the left-eye captured image and the right-eye captured image at the predetermined distance, which is obtained from the predetermined distance.

14. A non-transitory computer-readable recording medium recording a program for causing a computer, including an image sensor which includes a left-eye light-receiving element and a right-eye light-receiving element, and outputs a left-eye captured image for left eye and a right-eye captured image for right eye upon receiving light beams having passed through one imaging optical system, to execute the following steps:
- a detection step of detecting a difference, between the left-eye captured image and the right-eye captured image, of each of subjects included in the left-eye captured image and the right-eye captured image;
- a control step of controlling a focusing unit of the imaging optical system to focus on a given subject included in the left-eye captured image and the right-eye captured image, based on the difference of the given subject between the left-eye captured image and the right-eye captured image detected in the detection step; and
- a creation step of creating an image for binocular stereopsis using the left-eye captured image and the right-eye captured image,
- wherein in the creation step, the image for binocular stereopsis is created so that the difference, between the left-eye captured image and the right-eye captured image, of a subject which is different from the given subject and is included in both the left-eye captured image and the right-eye captured image has a predetermined value in the image for binocular stereopsis.

15. A non-transitory computer-readable recording medium recording a program for causing a computer, including an image sensor which includes a left-eye light-receiving element and a right-eye light-receiving element, and outputs a left-eye captured image for left eye and a right-eye captured image for right eye upon receiving light beams having passed through one imaging optical system, to execute the following steps:
- a detection step of detecting a difference, between the left-eye captured image and the right-eye captured image, of each of subjects included in the left-eye captured image and the right-eye captured image;
- a control step of controlling a focusing unit of the imaging optical system to focus on a given subject included in the left-eye captured image and the right-eye captured image, based on the difference of the given subject between the left-eye captured image and the right-eye captured image detected in the detection step; and
- a creation step of creating an image for binocular stereopsis using an extraction image, extracted from a region which includes the given subject and has a predetermined size, for each of the left-eye captured image and the right-eye captured image, the creation step setting the region so that the difference between the left-eye captured image and the right-eye captured image at a predetermined distance different from a distance between the given subject and the image capturing apparatus has a predetermined value in the image for binocular stereopsis,
- wherein in the creation step, the region is set based on a distance between the centers of gravity of the light beams used to output the left-eye captured image and the right-eye captured image, respectively, a distance between the image sensor and an exit pupil of the one imaging optical system, and the difference between the left-eye captured image and the right-eye captured image at the predetermined distance, which is obtained from the predetermined distance.

16. An image capturing apparatus comprising:
- an image sensor which receives light beams having passed through different pupil regions of one imaging optical system and output captured images; and
- one or more processors configured to function as the following units:
- a detection unit which is able to detect a difference, between the captured images, of each of subjects included in the captured images;
- a control unit which is able to control a focusing unit of the imaging optical system to focus on a given subject included in the captured images, based on the difference of the given subject between the captured images detected by the detection unit; and
- a creation unit which is able to create an image for binocular stereopsis using the captured images,
- wherein the creation unit create the image for binocular stereopsis so that the difference, between the captured images, of a subject which is different from the given subject and is included in both the captured images has a predetermined value in the image for binocular stereopsis.

* * * * *